Oct. 10, 1950           D. J. PEEPS           2,525,616
HOSE CONNECTION AND METHOD OF MAKING
Filed June 29, 1946
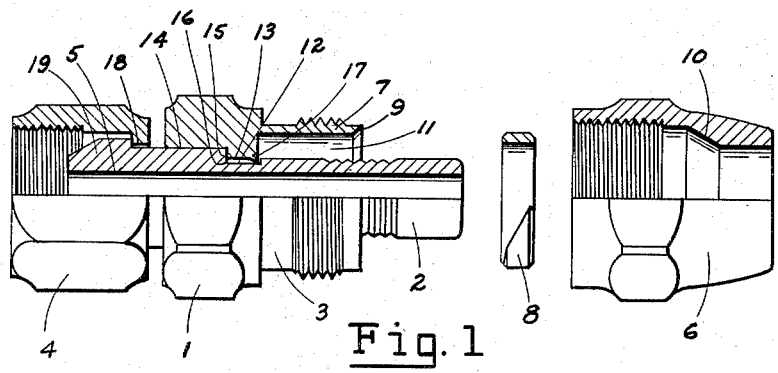
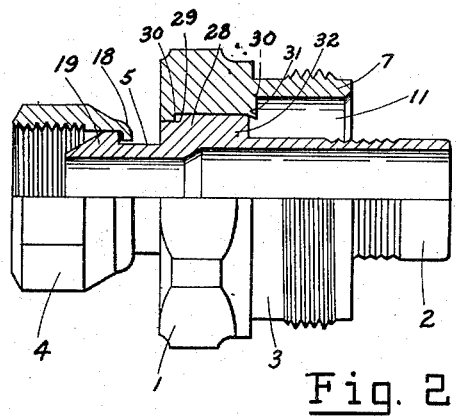
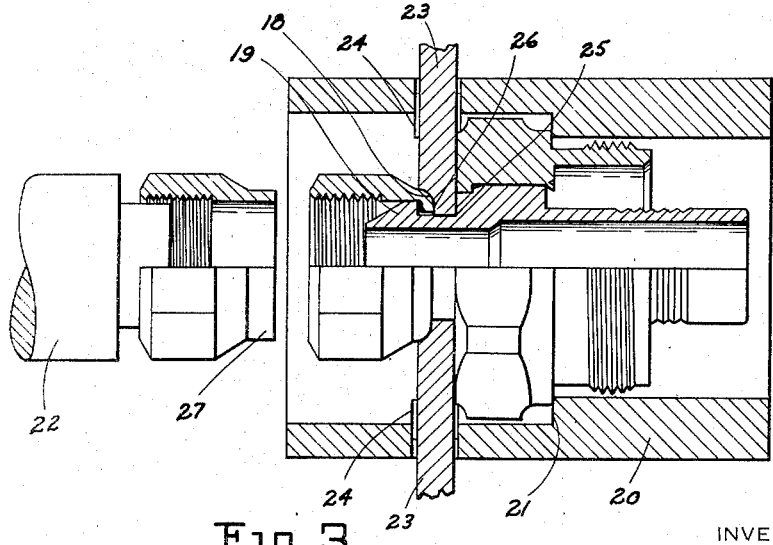
INVENTOR
DONALD J. PEEPS
BY *W. P. Carr*
ATTORNEY Patented Oct. 10, 1950

2,525,616

UNITED STATES PATENT OFFICE 2,525,616

HOSE CONNECTION AND METHOD OF MAKING

Donald J. Peeps, Toledo, Ohio, assignor to The De Vilbiss Company, Toledo, Ohio, a corporation of Ohio Application June 29, 1946, Serial No. 680,434

2 Claims. (Cl. 285—84)

The present invention relates to a hose connection of the type which may be removed from a worn out hose and attached to a new length. It includes a main body member with an inner tubular stem and an outer shell which are permanently fastened together.

In addition, the connection has a hose sleeve and compression ring. The latter is forced inwardly against the hose when the sleeve is threadedly drawn upon the hose connection body. The hose connection further includes a nut loosely carried on the end of the connection body member opposite to that on which the hose sleeve is mounted. This nut is used to fasten the hose to a source of fluid supply, to a spray gun or other appliance.

This invention relates primarily to the main body portion of the connection and the method by which the two parts of the body are held together. It also has to do with the method by which the nut is applied to the body.

The principal object of the invention is the provision of a hose connection that is easy and economical to produce. A further object is the provision of a hose connection that is simple in design and may be made with a few parts and yet be adaptable for various sizes of hose.

Another object of my invention is the provision of a hose connection which is sturdy and will stand up for a long period under the hard usage customarily borne by such parts.

Other advantages and objects of my invention will be apparent upon reading the following description and referring to the accompanying drawing, in which:

Fig. 1 is a side elevation, half in vertical section, of a connection embodying my invention. The sleeve and compression ring are shown separated from the hose connection body;

Fig. 2 is a similar view of a connection body of a slightly different form than that of Fig. 1; and Fig. 3 is an elevation, half in section of the connection body of Fig. 2 and also includes a view in vertical section of a work holder in which the connection body is placed while the nut is joined to it and of the swagging tools which forces the edge of the nut around the enlarged end of the stem. Also in Fig. 3 is illustrated a separate nut and the carrier tool by which it is to be brought into position in the work holder.

In the embodiment of Fig. 1 the main body member 1 is composed of an inner tubular stem 2 and an outer shell 3. The stem carries the hexagon nut 4 on its forward end 5. The sleeve 6 is fastened to the threaded extension 7 of the shell 3 when it is desired to join the connection to a hose. The split compression ring 8 is located between the opposing bevelled shoulders 9 and 10 on the body and sleeve respectively, and constricted thereby inwardly into clamping relation to the end of the hose placed over the stem 2 and into the annular cavity 11 between the stem 2 and threaded extension 7.

In the form of the invention illustrated in Fig. 1 the inner stem 2 has a shallow peripheral groove 12 between the end of the stem over which the hose is applied and the forward portion to which the swivel nut is attached.

The outer shell 3 has an inwardly directed flat annular flange 13 substantially equal in width to the peripheral groove 12 in the stem.

Forwardly of the flange 13 the shell has a bore 14 which fits snugly over the forward end of the stem. The axial bore circumscribed by the flange is of sufficient diameter to slip over the reduced diameter of the rearward portion of the stem to permit the shell and stem to be brought together into assembled relation. In this combined position the forwardly facing side 15 of the flange 13 abuts against the rearwardly facing side or shoulder 16 of the groove 12.

To hold the shell 3 permanently upon the stem 2, the inner edge of the rearwardly directed side of the flange 13 is struck sharply with a pointed tool at several circumferentially spaced locations such as indicated at 17. This drives a portion of the rim of the flange into the groove 12 and against the rearwardly located, but forwardly facing side of the groove. The displaced material will oppose any force inclined to separate the shell rearwardly from the stem. This staking operation is preferably applied at four equidistant points around the axis of the body. A composite tool may be devised to do all the staking at one time.

In the connection shown in Fig. 1 the hexagon nut 4 is slipped over the stem from the rear end prior to the assembly upon the stem of the outer shell. However, in many instances it is desired to use a nut 4 of comparatively small size upon a connection to be fastened to a hose of comparatively large diameter. The stem for such a hose may be too large to permit the nut to be slipped over it. A connection of this type is shown in Figs. 2 and 3.

For such connections it has previously been the practice to make the stem in two parts with a forward nipple part small enough to be slipped through the nut and then attached to the rearward part with the large diameter.

With my invention the in-turned flange or shoulder 18 is not formed on the nut 4 until the latter is positioned over the head 19 of the stem 2 as shown in Fig. 3.

This is accomplished by mounting the connection body in a fixture such as 20 of Fig. 3. This has a forwardly facing shoulder 21 which locates and axially supports the connection body. The nut to be fastened to the body is held in place over the head 19 of the stem 2 by a carrier tool 22. While the nut is so placed forming tools 23 are projected through appropriate ports 24 in the walls of the fixture 20. These have arcuate shaped ends 25 with curved facings 26 which bear against the straight skirt 27 of the unformed nut and forces it uniformly inwardly behind the head 19 of the nipple 2. In Fig. 3 the carrier tool 22 is shown outside of the work holder 20 with an unformed nut ready to be brought into assembling position.

The arrangement utilized for fastening the shell 2 to the nipple 3 of the connection body of Figs. 2 and 3 is a modification of that utilized for the connection body in Fig. 1. In this second form the shell and stem portions are telescoped together by inserting the stem into the shell from the rear end. Instead of a groove this stem has an annular flange 28 with a step 29 along its forward edge. The shell fits closely over this flange and has a conforming square lip 30 which fits the step 29. To prevent the two parts from being separated the rearwardly facing shoulder 30 of the shell is staked at 31. This action displaces a portion of the metal inwardly against the rearwardly facing side 32 of the flange 28, thus locking the two parts together. As with the connection body of Fig. 1 this staking operation is preferably done at four equidistant points around the connection body.

It may be seen from the preceding description that the hose connection of my invention is easily assembled and contains a minimum number of components.

I wish it understood that my invention has been set forth herein by way of example only and that numerous modifications therein may be devised without departing from the inventive concept.

Having thus described my invention, what I claim to be new and desire to secure by U. S. Letters Patent, is:

1. A method of producing a hose connection body comprising an inner tubular stem and an outer bushing-like shell which consists in forming the tubular stem with an enlarged nipple at one end for holding a connecting nut, a cylindrical section adjacent the nipple, a square-shouldered groove adjacent to the cylindrical section, a second cylindrical section next to the groove on the other side from the first section, said second section being of lesser diameter than the first section, forming the shell with a substantial rigid body section and an axial bore, a substantial portion of said bore having a diameter closely fitting over the first cylindrical section of the stem, an inwardly directed annular flange constituting a restricted continuance of the bore, said flange providing just sufficient clearance to permit the shell to be moved over the section of the stem having the smaller diameter, drawing the shell over the stem until the side of the flange on the shell abuts against the side of the groove formed by the cylindrical section of a larger diameter and staking the edge of the other side of the flange to spread it inwardly into the groove within the diameter of the other side of the groove so as to lock the stem and the shell in assembled relation.

2. A hose connection including a tubular stem, a threaded nut on the forward end of the stem, means on the rearward end for receiving a hose, a flat-bottomed, shallow, peripheral groove with square cut edges around the mid-portion of the tubular stem, the stem having a cylindrical section extending forwardly from the groove toward the nut end of the stem, a second cylindrical section of smaller diameter than that of the first section extending from the groove rearwardly toward the hose end of the stem, a bushing-like shell positioned in encircling relation upon the stem, a bore through the forward end of the shell closely fitting the larger diameter cylindrical section at the forward end of the stem, an annular flat flange rearwardly adjacent to the bore within the shell, said flange being of substantially equal width as the groove over which it lies, the forward side of the flange abutting against the forward side of the groove, the radial diameter of the face of the flange being just slightly larger than the diameter of the smaller rearward cylindrical section of the stem, and inwardly displaced material along the rearward inner edge of the flange, said material abutting against the rearward side of the groove, said side constituting the forward end of the smaller rearward cylindrical section.

DONALD J. PEEPS.

REFERENCES CITED

The following references are of record in the file of this patent:

UNITED STATES PATENTS

| Number | Name | Date |
| --- | --- | --- |
| 1,994,784 | Parzel | Mar. 19, 1935 |
| 2,068,494 | Kuhn | Jan. 19, 1937 |
| 2,090,251 | Cowles | Aug. 17, 1937 |
| 2,314,002 | Lusher | Mar. 16, 1943 |
| 2,374,226 | Melsom | Apr. 24, 1945 |
| 2,406,281 | Dahl | Aug. 20, 1946 |